United States Patent [19]

Walz et al.

[11] Patent Number: 4,510,583

[45] Date of Patent: Apr. 9, 1985

[54] KEYBOARD TERMINAL

[75] Inventors: George A. Walz, East Islip; Donald H. Kump, East Northport, both of N.Y.

[73] Assignee: Grumman Aerospace Corporation, Bethpage, N.Y.

[21] Appl. No.: 648,845

[22] Filed: Sep. 7, 1984

Related U.S. Application Data

[63] Continuation of Ser. No. 340,699, Jan. 19, 1982, abandoned.

[51] Int. Cl.[3] ............................................. G06F 3/02
[52] U.S. Cl. .................................. 364/900; 364/709; 371/15
[58] Field of Search ............... 364/709, 710, 715, 200, 364/900; 340/365 R, 365 S, 712; 178/17.5; 371/20, 16, 15

[56]  References Cited

U.S. PATENT DOCUMENTS

| | | | |
|---|---|---|---|
| 3,187,321 | 6/1965 | Kameny | 340/712 |
| 3,588,841 | 6/1971 | Ragen | 364/200 |
| 4,037,092 | 7/1977 | Osborne | 364/706 |
| 4,085,443 | 4/1978 | Dubois et al. | 364/900 |
| 4,145,687 | 3/1979 | Masuda | 340/365 S |
| 4,145,742 | 3/1979 | Olander | 364/709 |
| 4,145,752 | 3/1979 | Olander | 364/709 |
| 4,202,041 | 5/1980 | Kaplow et al. | 364/900 |
| 4,222,038 | 9/1980 | Magerl | 340/365 S |
| 4,333,091 | 6/1982 | Perdue | 340/365 S |
| 4,385,366 | 5/1983 | Housey | 364/900 |

OTHER PUBLICATIONS

"Microcomputer-Based Intelligent Keyboard", *Product Sheet* 103sd30-2, Micro Switch (A Division of Honeywell).

*Primary Examiner*—Jerry Smith
*Assistant Examiner*—Michael R. Fleming
*Attorney, Agent, or Firm*—Bernard S. Hoffman; Richard G. Geib; Daniel J. Tick

[57] ABSTRACT

A keyboard terminal for entering test programs written in an English-format computer programming language into computerized automatic test systems is disclosed. In response to the activation of selected user-activated keys associated with a programmable keyboard, a preprogrammed microprocessor control system generates word character strings corresponding to the words of a predetermined test programming language, thereby allowing single keystroke entry of test program words into a control computer associated with the automatic test system.

6 Claims, 3 Drawing Figures

KEYBOARD TERMINAL

This application is a continuation of application Ser. No. 340,699, field Jan. 19, 1982 and now abandoned.

BACKGROUND OF THE INVENTION

This invention relates to the field of automatic test equipment, and more particularly to a keyboard terminal for entering test programs into computerized automatic test equipment (ATE).

Typically, sophisticated ATE configured as an automatic test station finds wide application in the avionics instrumentation field. Examples of such ATE are found in the computerized automatic testers (CAT-series) sold by the assignee herein, Grumman Aerospace Corporation. Automatic testing of the various electronic systems and subsystems of an aircraft may be readily conducted by means of such automatic test equipment in conjunction with user-generated test programs.

ATLAS is a high level computer programming language intended specifically for automatic test programming. It is at this time becoming standard, on an industry-wide basis, and is likely to be used as the source for the great majority of test programs developed over the next several years.

As a programming language, ATLAS is characterized by the use of common English words and grammer. For this reason, it requires more characters per instruction, as compared to other, older mathematical format test languages. Accordingly, more time and effort are required of programmers and test engineers who use the ATLAS language. In addition, test programs written in the ATLAS language often contain errors introduced by the normally lengthy typing process. Accordingly, conventional keyboard terminals for entering test programs written in an English-format computer programming language, such as ATLAS, are afflicted with the same drawbacks and limitations.

An optimal keyboard for entering test programs written in an English-format computer programming language into computerized automatic test systems should have several basic capabilities. First, it should reduce the physical time and effort required to enter program words into the system. Second, it should be relatively error-free. And finally, it should have the capability to generate an entire word of the programming language in response to relatively few keystroke entries.

It is accordingly a general object of the present invention to overcome the aforementioned limitations and drawbacks and to provide a keyboard terminal for entering test program words into computerized automatic tests systems having all of the desirable attributes noted above.

It is a specific object of the present invention to provide an ATLAS language keyboard terminal.

Other objects will be apparent in the following detailed description and the practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as a keyboard terminal.

The keyboard terminal consists of a keyboard means including a plurality of user-activated test language keys, and preprogrammed means operatively connected and responsive to the plurality of user-activated test language keys for generating a corresponding plurality of word character strings. Each of the generated word character strings represents a unique word of a predetermined test programming language. The preprogrammed means also includes means for transferring the generated word character strings to a control computer.

BRIEF DESCRIPTION OF THE DRAWINGS

Serving to illustrate an exemplary embodiment of the invention are the drawings of which:

FIGS. 2A and B illustrate the character assignment and the corresponding test language keys, respectively, for the keyboard utilized in the terminal illustrated in FIG. 1.

DETAILED DESCRIPTION OF THE PREFERRED EMBODIMENT

Figure 1:
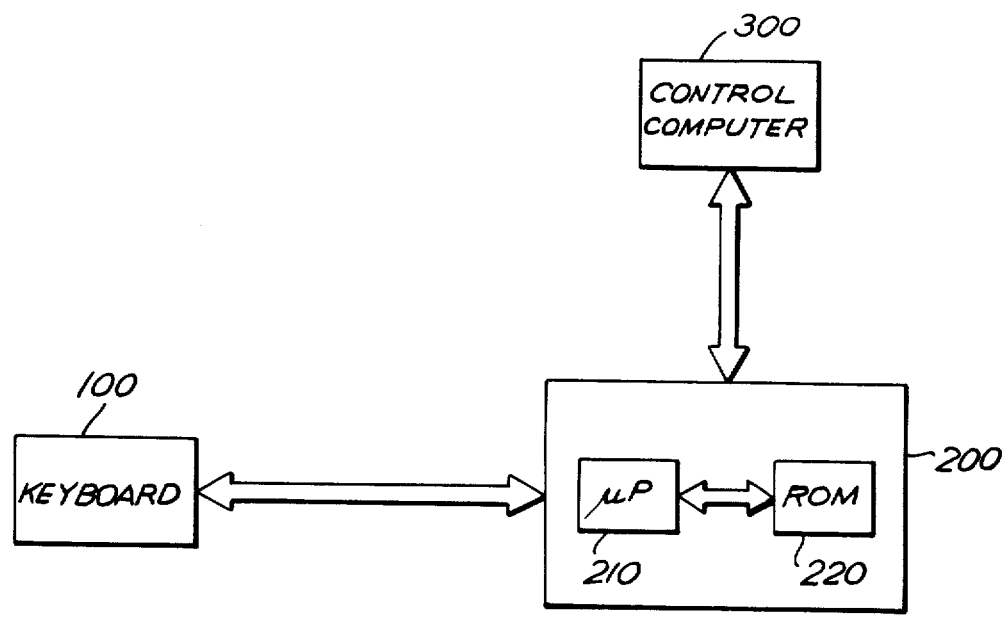
FIG. 1 is a block diagram of the keyboard terminal, in accordance with the present invention.

A block diagram of the keyboard terminal of the present invention is illustrated in FIG. 1. As shown therein, the keyboard terminal includes a standard programmable keyboard 100 and a microprocessor control system 200. The programmable keyboard 100, such as, for example, the MicroSwitch Model 103SD30-2 Intelligent Keyboard with 128 key option, has been modified to contain a plurality of definable keys for initiating single key activation of the unique keywords used in composing a predetermined English-format test program. For example, in the case of the ATLAS test programming language, keyboard 100 would have more than seventy definable keys, each corresponding to a unique ATLAS keyword.

Figures 2A, 2B:
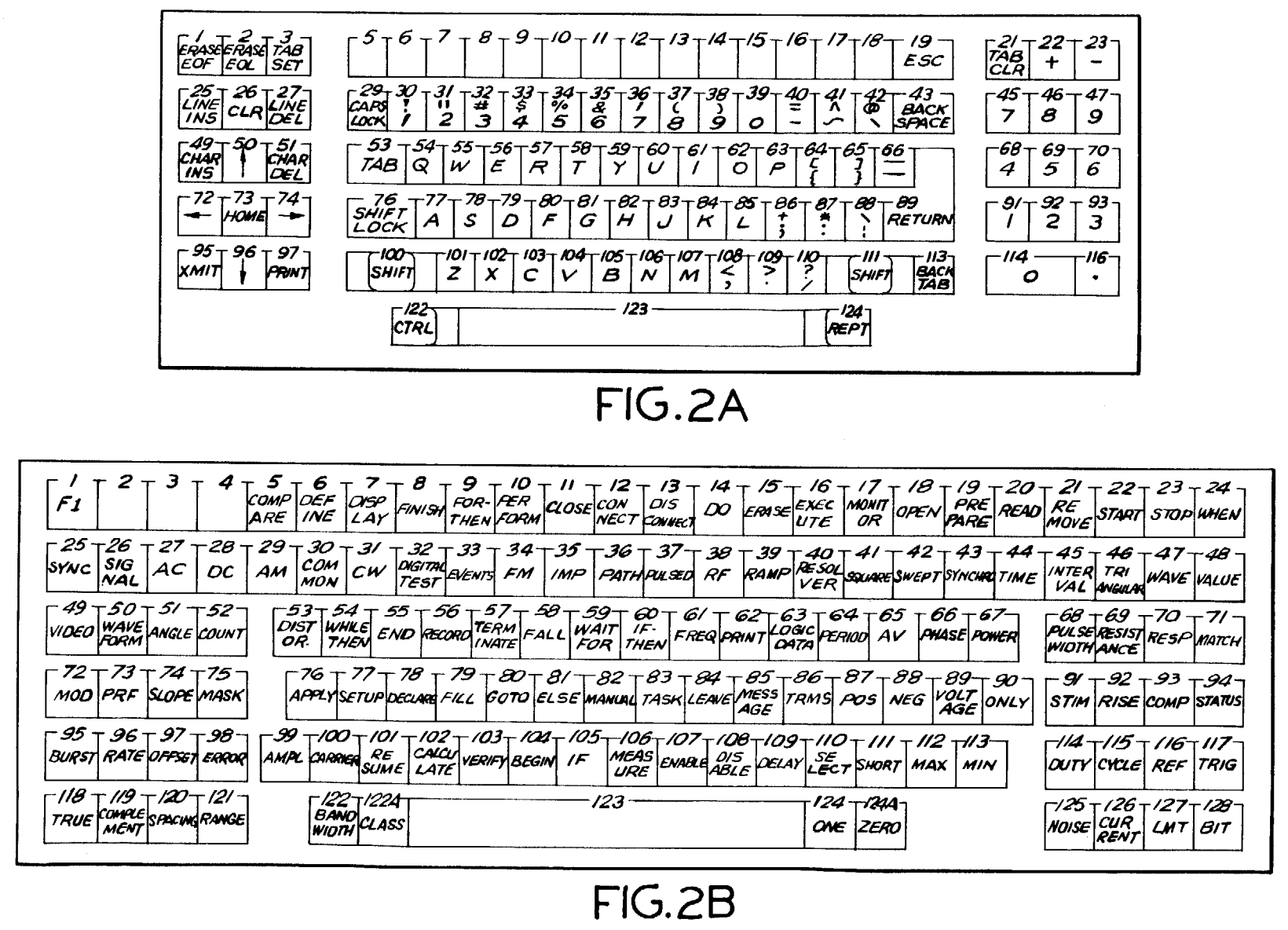

The correspondence between the character assignment and the corresponding ATLAS test language keys for the MicroSwitch keyboard is illustrated in FIGS. 2A and B. Comparing the character assignment illustrated in FIG. 2A with the test language keys illustrated in FIG. 2B, it is noted that the upper left test language key F1 is utilized by the user to change from the conventional keyboard illustrated in FIG. 2A to the test language keyboard illustrated in FIG. 2B. More specifically, depressing the F1 key allows the user to switch from typewriter letter format to the ATLAS language keyboard.

A microprocessor control system 200 including a microprocessor 210, such as, for example, Intel 8080, and an associated read-only-memory (ROM) 220, such as, for example, Intel 8ZS115, is preprogrammed to generate an appropriate word character string for each of the test language keywords upon activation of the corresponding key on keyboard 100.

The operation of the microprocessor control system 200 is as follows. A keystroke generates an interrupt to micro-processor 210 causing it to read its input-output port and obtain the numerical code generated as a result of the keystroke. The numerical code is used as a pointer to a table in ROM 220 which allows a routine in microprocessor 210 to fetch the appropriate ASCII string that represents the ATLAS keyword unique to the key on keyboard 100 that was activated. The ASCII word character string is then transferred via conventional means (not shown), such as, for example, an IEEE-488-(1975) bus compatible interface network to a control computer 300 associated with an automatic test system (not shown).

To better understand the operation of the keyboard terminal of the present invention, an illustrative example may be helpful. Using the ATLAS verb "MEASURE" as an example, the following sequence of operations illustrates how the keyboard terminal is used to generate an entire word from a single keystroke. If the keyboard 100 is not in the test language mode, the user first depresses the F1 key to place it in that mode.

To enter the test word "MEASURE" the user interacts with keyboard 100 which contains a number of definable keys corresponding to the number of test words in the ATLAS language. Pressing the key on keyboard 100 corresponding to the test word "MEASURE" causes a signal to be generated and transmitted to the microprocessor control system 200. Upon receipt of the signal generated by the activation of the "MEASURE" key, the preprogrammed microprocessor 210 causes the ASCII characters corresponding to the ATLAS test word "MEASURE" stored in ROM 220 to be read out of the memory and the word character string to be transferred to the control computer 300.

In a like manner, other keys on keyboard 100 are programmed to generate other ATLAS words, such as "VERIFY", "VOLTAGE", etc. so that the user can construct complete ATLAS statements made up of combinations of automatically generated ATLAS words and conventionally typed punctuation and characters.

It is clear that the above description of the preferred embodiment in no way limits the scope of the present invention which is defined by the following claims.

What is claimed is:

1. An ATLAS language keyboard terminal specifically designed for automatically entering ATLAS language test programs into computerized automatic test equipment utilized for testing various electronic systems, comprising:

programmable keyboard means including a plurality of user activated definable keys for initiating single key activation of the unique keywords used in composing the ATLAS language test programs; and preprogrammed microprocessor control means operatively connected to the computerized automatic test equipment and operatively connected and responsive to said plurality of user activated definable keys of said programmable keyboard means, said preprogrammed microprocessor control means generating a plurality of word character strings representing unique words of the ATLAS language test programs, each word character string of said plurality of word character strings representing a unique word of the ATLAS language test program and being initiated by a single stroke of a respective key of said plurality of user activated definable keys and automatically transferred by said preprogrammed microprocessor control means to a control computer associated with the computerized automatic test equipment so that ATLAS language test programs are inputted into the computerized automatic test equipment and automatic testing of the various electronic systems may be readily conducted by allowing the entry of ATLAS language test program words into the computerized automatic test equipment to be relatively error free and requiring a reduced amount of physical time and effort since the generation of an entire word of the ATLAS language test programs and its automatic transfer to the computerized automatic test equipment is accomplished in response to one keystroke entry on said programmable keyboard means.

2. The keyboard terminal as defined in claim 1, wherein said preprogrammed microprocessor control means includes a microprocessor for generating a numerical code such that each number in said numerical code is associated with a particular user activated definable key of said plurality of user activated definable keys.

3. The keyboard terminal as defined in claim 2, wherein said preprogrammed microprocessor control means further comprises a read-only-memory responsive to said numerical code generated by said microprocessor and generating a word character string comprising binary numbers when a single user activated definable key of said plurality of user activated definable keys is activated by a user.

4. The keyboard terminal as defined in claim 3, wherein each of said binary numbers represents an ASC II character such that a plurality of ASC II characters in said word character string of said plurality of word character strings corresponds to the characters in a unique ATLAS keyword on the single user activated definable key of said plurality of user activated definable keys that is activated by the user.

5. The keyboard terminal as defined in claim 1, wherein said programmable keyboard means further includes a test language key, a conventional keyboard, and a selective ATLAS test language keyboard, said test language key being utilized by the user to change said conventional keyboard to said ATLAS test language keyboard and vice versa.

6. The keyboard terminal as defined in claim 5, wherein said ATLAS test language keyboard contains a number of user activated definable keys corresponding to the number of test words in the ATLAS test language.

* * * * *